K. W. LINDMAN.
BALL HOLDER FOR BALL BEARINGS.
APPLICATION FILED APR. 10, 1918.
1,395,126.
Patented Oct. 25, 1921.
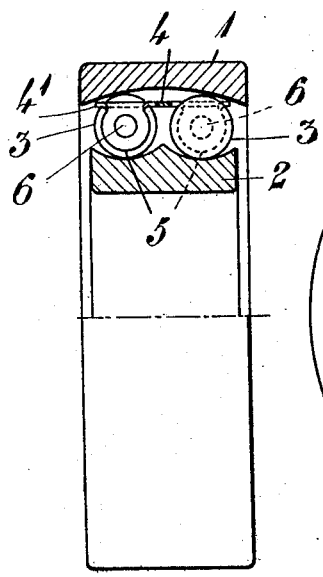
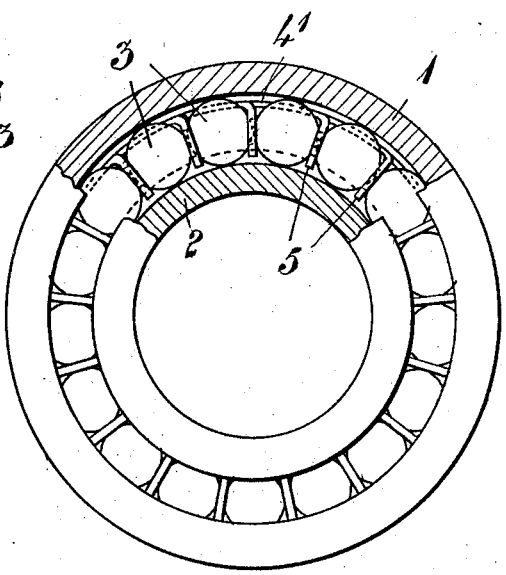
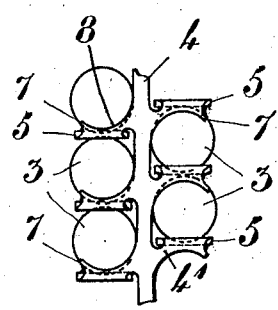
Inventor:
Konrad W. Lindman

UNITED STATES PATENT OFFICE.

KONRAD WERNER LINDMAN, OF STOCKHOLM, SWEDEN, ASSIGNOR, BY MESNE ASSIGNMENTS, TO NORDISKA KULLAGER AKTIEBOLAGET, OF GOTTENBORG, SWEDEN, A LIMITED COMPANY OF SWEDEN.

BALL-HOLDER FOR BALL-BEARINGS.

1,395,126.  Specification of Letters Patent.  Patented Oct. 25, 1921.

Application filed April 10, 1918. Serial No. 227,619.

*To all whom it may concern:*

Be it known that I, KONRAD WERNER LINDMAN, subject of the King of Sweden, residing at Västra Trädgårdsgatan 4, Stockholm, in the Kingdom of Sweden, have invented certain new and useful Improvements in Ball-Holders for Ball-Bearings; and I do hereby declare the following to be a full, clear, and exact description of the invention, such as will enable others skilled in the art to which it appertains to make and use the same.

The present invention has for its object the production of a ball holder for ball bearings with one or more rows. In accordance with this invention, the ball holder is formed of a ring of plate or the like, intended to be placed between the outer and inner rings of the ball bearing, and provided with laps or projections stamped out of it or fashioned out of it in some other manner, integral with the ring, which laps are bent in a radial, or in a mainly radial direction, in such a manner that they form supports or partitions between adjacent balls in the same row of balls.

In order to make plain the invention, there is shown on the accompanying drawing, by way of example, a form of a ball holder, intended for a double-row ball bearing constructed in accordance with the present invention. Figure 1 shows an axial section of a part of the ball bearing; Fig. 2 the same in side view and partial cross section. Fig. 3 shows, viewed from above, a part of the actual ball holder (rectified in one plane) with balls inserted in it. 1 designates the outer ring of the ball bearing, 2 the inner ring, and 3 the balls. The ball holder 4 is formed of a ring 4' of material suitable for the purpose, e. g. a plate ring, out of which laps 5 are stamped, or otherwise fashioned, so that they are integral with the ring, and bent in a radial, or in a mainly radial, direction, so that they form partitions between and supports for adjacent balls in the same row of balls. In order that the laps 5 may give a better support to the balls and hold them more securely in their position, they are suitably provided with spherical recesses or apertures 6, corresponding to their points of contact with the balls, into which recesses or holes the balls enter, so that they are held more securely.

In a ball holder for double row ball bearings laps 5 on either side are suitably arranged in such a manner that the laps 5 on one side lie half-way between or approximately halfway between the laps 5 on the other side of the ball holder.

In order to render still more secure the holding of the balls in their position in the ball holder, the latter may be provided with tongues or projections 7 (see Fig. 3) fashioned out of rings 4', which tongues, etc., do not lie in the same plane as the laps 5; but, for example, as is apparent from the drawing, coincide with the curvature of the ring 4', which projections are each provided with a circular edge 8 which forms a support for the balls.

The balls can be easily pressed into their position in the ball holder between the laps 5, which then, by reason of their elasticity, readily yield to the pressure. In inserting the last ball stronger pressure must obviously be exercised. Both the laps 5 and also the apertures 6 in it and the projections 7 can be stamped out by the same operation, whereby the costs of manufacture will be relatively low.

The ring 4' may be formed of a strip of sheet metal which is bent in the form of a ring having its ends connected to each other by soldering, welding, rivets or in any other suitable manner. The rings may also be formed by taking a metallic tube of the required diameter and cutting off transverse sections wide enough to form the ring and the laps and tongues associated therewith.

Having thus described my invention, I declare, that what I claim is:—

1. A ball holder for ball bearings consisting of a cylindrical ring of sheet metal, adapted to be located between the outer and inner rings of the ball bearing, said ring being formed with laps in one piece with the ring, the laps being bent inwardly in radial direction along generatrices of the ring so as to form partitions between adjacent balls in the same row of balls, the parts of the ring which are opposite the laps, forming axial projections with circular edges, adapted to form supports for the balls.

2. A ball holder for ball bearings consisting of a cylindrical ring of sheet metal, adapted to be located between the outer and inner rings of the ball bearing, said ring being formed with laps in one piece with the ring, the laps being bent inwardly in radial direction along generatrices of the ring, so as to form partitions between adjacent balls in the row of balls, said laps being formed with recesses adapted to form supports for the balls.

3. A ball holder for ball bearings consisting of a cylindrical ring of sheet metal, adapted to be located between the outer and inner rings of the ball bearing, said ring being formed with laps in one piece with the ring, the laps being bent inwardly in radial direction along generatrices of the ring so as to form partitions between adjacent balls in the same row of balls, said laps being formed with apertures adapted to form supports for the balls.

4. A ball holder for ball bearings consisting of a ring of metal, extending in axial direction between the outer and inner rings of the ball bearing, said ring being formed with laps in one piece with the ring and bent inward in radial direction, so as to form partitions between adjacent balls in the same row of balls, said laps being formed with apertures adapted to form supports for the balls.

In testimony whereof I affix my signature.

KONRAD WERNER LINDMAN.

Witnesses:
 AUG. HAGELIN,
 ALMA PETERSSON.